United States Patent
Bender (10) Patent No.: US 8,402,017 B2
(45) Date of Patent: Mar. 19, 2013

(54) METHOD FOR ALTERING DATABASE VIEWS DEPENDENT ON RULES

(75) Inventor: Michael Bender, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 1302 days.

(21) Appl. No.: 11/608,545

(22) Filed: Dec. 8, 2006

(65) Prior Publication Data

US 2008/0140620 A1   Jun. 12, 2008

(51) Int. Cl.
*G06F 17/30* (2006.01)

(52) U.S. Cl. .................................................... 707/717

(58) Field of Classification Search .................. 707/3, 9
See application file for complete search history.

(56) References Cited

U.S. PATENT DOCUMENTS

| | | | | |
|---|---|---|---|---|
| 5,737,591 | A  * | 4/1998 | Kaplan et al. | 707/1 |
| 5,751,949 | A  * | 5/1998 | Thomson et al. | 726/4 |
| 6,134,549 | A  * | 10/2000 | Regnier et al. | 707/9 |
| 6,629,094 | B1 * | 9/2003 | Colby et al. | 707/4 |
| 7,216,126 | B2 * | 5/2007 | Choy | 707/9 |
| 2004/0044655 | A1* | 3/2004 | Cotner et al. | 707/3 |
| 2004/0122849 | A1* | 6/2004 | Nelson | 707/102 |
| 2005/0055337 | A1* | 3/2005 | Bebo et al. | 707/3 |
| 2005/0177570 | A1* | 8/2005 | Dutta et al. | 707/9 |
| 2006/0136479 | A1* | 6/2006 | Fan et al. | 707/102 |

* cited by examiner

*Primary Examiner* — Jorge A Casanova
(74) *Attorney, Agent, or Firm* — Yee & Associates, P.C.; John Pivnichny (57) ABSTRACT

A computer implemented method, computer program product, and data processing system for dynamically altering database views, based on a set of administrator-defined rules. The dynamic view system determines whether the query, requested by a user, has an associated view rule. The system determines if the view rule is satisfied. In response to a satisfied associated view rule, the altered view is returned to the user.

14 Claims, 5 Drawing Sheets

| % GOOD PARTS | | | | |
|---|---|---|---|---|
| WEST FACTORY | | | | |
| | WEEK 7 | | WEEK 8 | |
| | ALPHA | BETA | ALPHA | BETA |
| MONDAY | 96 | 96 | 0 [CLOSED] | 0 [CLOSED] |
| TUESDAY | 92 | 92 | 0 [CLOSED] | 0 [CLOSED] |
| WEDNESDAY | 91 | 90 | 90 | 90 |
| THURSDAY | 94 | 93 | 92 | 92 |
| FRIDAY | 92 | 92 | | |

*FIG. 5B*

| % GOOD PARTS | | |
|---|---|---|
| REGIONAL OFFICE | | |
| | WEEK 7 | WEEK 8 |
| MONDAY | 95 | 42 |
| TUESDAY | 94 | 43 |
| WEDNESDAY | 94 | 44 |
| THURSDAY | 95 | 43 |
| FRIDAY | 93 | |

*FIG. 5C*

| % GOOD PARTS | |
|---|---|
| COMBINED REGIONAL AVERAGE | |
| DAILY | 43 |
| WEEKLY | 94 |
| MONTHLY | 96 |
| YEAR | 94 |
| LAST YEAR | 92 |

METHOD FOR ALTERING DATABASE VIEWS DEPENDENT ON RULES

BACKGROUND OF THE INVENTION

1. Field of the Invention

The illustrative embodiments relate generally to an improved data processing system and in particular to a method and system for processing data. Still more particularly, the illustrative embodiments are related to a computer implemented method, computer program product, and system for dynamically altering database views, based on an administrator-configured rule set.

2. Description of the Related Art

In a database management system a database view is a virtual or logical table composed of the result set of a query. A query is a precise request for information, typically keywords combined with Boolean operators and other modifiers, in the field of information retrieval. Unlike ordinary tables (base tables) in a relational database, a database view is not part of the physical schema. They can join and simplify multiple tables into a single virtual view. Views can act as aggregated tables, where aggregated data is calculated and presented as part of the data. Views can hide the complexity of data; for example, a database view could appear as Sales2000 or Sales2001, transparently partitioning the actual underlying table, AllSales. Typically, views do not incur any extra storage overhead.

Various database management systems have extended the views from read-only subsets of data. The Oracle Corporation, located in Redwood Shores, Calif., introduced, in the Oracle™ database, the concept of materialized views. Materialized views are pre-executed, non-virtual views commonly used in data warehousing. They are a static snapshot of the data and may include data from remote sources. The accuracy of a materialized view depends on the frequency or trigger mechanisms behind the materialized view's updates.

DB2™ provides materialized query tables (MQTs) for the same purpose. DB2™ is a trademark of International Business Machines Corporation of New York. The equivalent of materialized query tables in Microsoft SQL Server™ is an indexed view. Microsoft SQL Server™ is a trademark of Microsoft Corporation of Washington.

SUMMARY OF THE INVENTION

The illustrative embodiments provide a computer implemented method, computer program product, and data processing system for dynamically altering database views, based on a set of administrator-defined rules. The dynamic view system determines whether the query, requested by a user, has an associated view rule. The system determines if the view rule is satisfied. In response to a satisfied associated view rule, the altered view is returned to the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
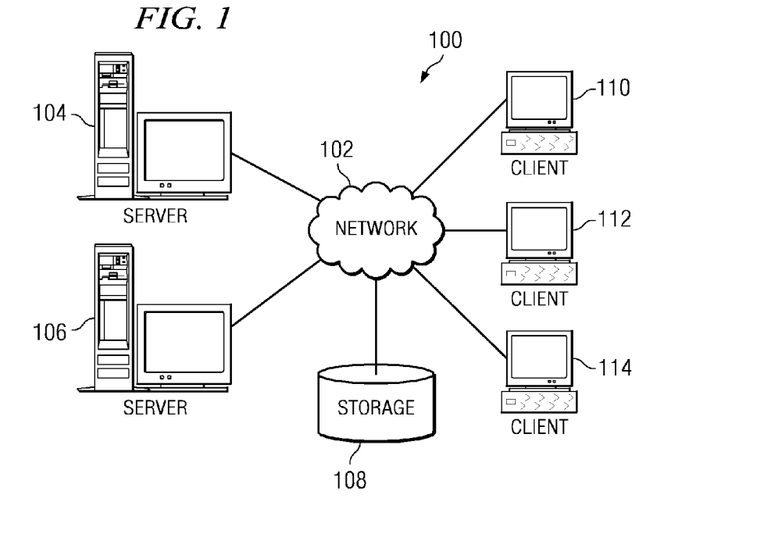
FIG. 1 depicts a pictorial representation of a network of data processing systems in which illustrative embodiments may be implemented.
Figure 2:
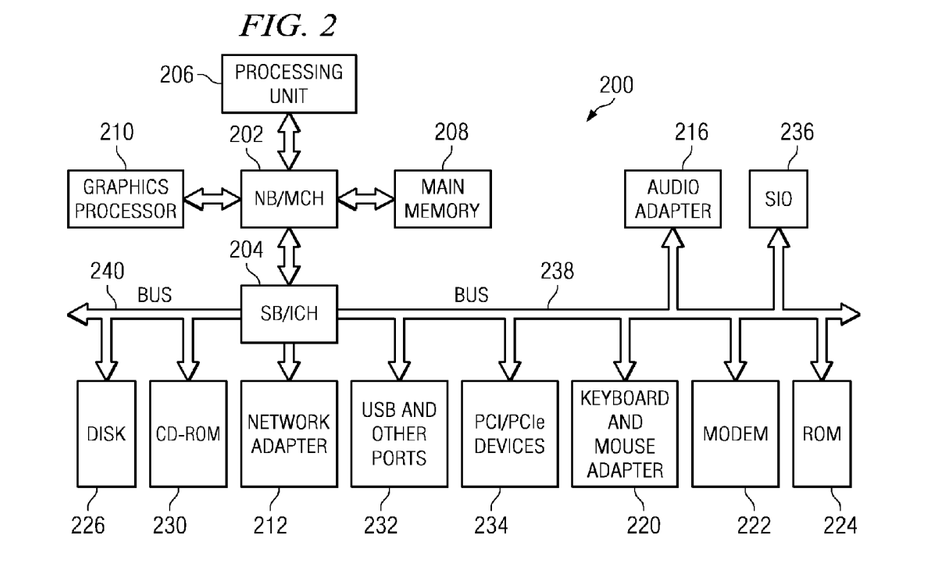
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, computer program product, and data processing system for dynamically altering database views, based on a set of administrator-defined rules. The dynamic view system determines whether the database view, requested by a user, has an associated administrator-defined view rule. A rule may be a compound rule, comprised of sub-rules. A rule as used herein may be a complete rule or a sub-rule. Upon a user query, the dynamic view system determines if the query is associated with a view rule. If there is an associated view rule, and the associated view rule is satisfied, the dynamic view system alters the database view that is returned to the user. In the case of a compound rule with a plurality of sub-rules, the dynamic view system alters the database view based upon the first sub-rule that is satisfied. Therefore, the system administrator sequences the sub-rules in order of priority.

The administrator-defined view rule may determine the database view created depending on the requester, or the location of the requestor. A user is a requester of the query and may be a person, program, or process that requests the query. For example, the administrator may want the data viewed by a public user to be different from the data viewed by the financial officer. The administrator-defined view rules may also determine the database view created depending on the data that is in a table. For example, managers may not wish to see an incomplete data table. The administrator may define a view rule that checks a table to determine if the table is complete before returning the database view. If the table is not complete, the database view may be altered and return a database view with a different, in this example, complete table. An example of circumstance appropriate for an altered database view may be a manager only wants to view the numbers for a month once the month end numbers are complete. If the manager queries the system before the month end, a table containing the data from a previous month may be the database view that is returned.

Yet another administrator-defined view rule may depend upon whether tables are inner joined in a query. An inner joined table is formed by the intersection data between tables. For example, two factories may maintain tables containing product data for the same two customers. The administrator may not want the customer to view the factory-specific data. Therefore, when the customer queries the data management system for product information concerning the customer product, the two factory tables are inner joined and the data concerning that customer is included in the inner joined table. The view rule may dictate the fields that the customer views in the inner joined table. Therefore, factory-specific data is not included in the altered database view that is returned to the user.

Figure 3:
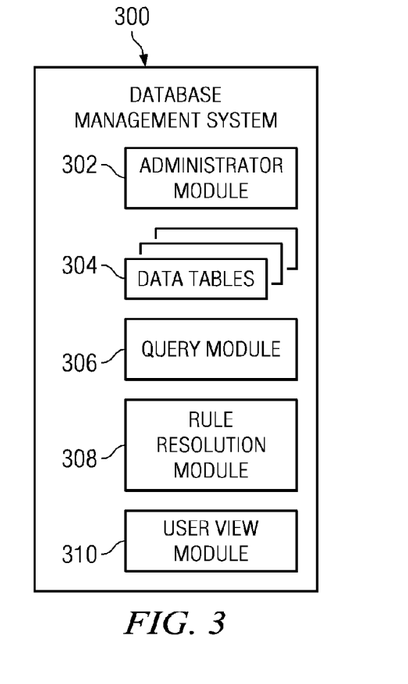
FIG. 3 is a block diagram of a database management system in which illustrative embodiments may be implemented.

FIG. 3 is a block diagram of the top-level components for dynamically altering a database view in accordance with the illustrative embodiments. Database management system 300 consists of an administrator module 302, data tables 304, query module 306, rule resolution module 308, and user view module 310. Administrator module 302 is the subsystem in which the system administrator defines view rules for a query. The administrator may define the view rules so that the view of the database may be altered dynamically. Data tables 304 may consist of any type of data and be within the scope of the illustrative embodiments. Query module 306 may be a list of pointers that identify the queries that are bound by view rules. Rule resolution module 308 evaluates the view rules that are associated with a query. Rule resolution module 308 may reside in a processing unit, such as processing unit 206 in FIG. 2. User view module 310 displays the returned database view determined by rule resolution module 308. The user view module may reside in a client, such as client 110 in FIG. 1.

Figure 4:
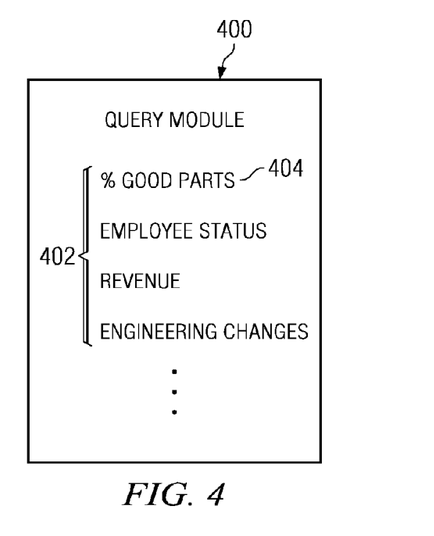
FIG. 4 depicts a query module, which lists the queries with which view rules have been associated in accordance with the illustrative embodiments.

FIG. 4 depicts a query module, which lists the queries with which rules have been associated in accordance with the illustrative embodiments. Query module 400, such as query module 306 in FIG. 3, may comprise a list of queries 402, or may comprise a list of pointers that indicate the view rules associated with the respective queries. Therefore, each query in list 402 indicates a query that has an associated view rule. Each of the associated view rules are defined in an administration module, such as administration module 302 in FIG. 3. One such example is the query "% Good Parts" 404 listed in Query module 400. Example query "% Good Parts" 404 has an associated view rule contained in an administrator module, such as administrator module 302 in FIG. 3. Example query "% Good Parts" 404 is expanded in FIG. 6.

FIG. 5 shows example data tables used to illustrate the many features of the illustrative embodiments. FIGS. 5A, 5B, 5C, and 5D depict tables 500, 510, 520 and 530, respectively. The data tables depicted are data tables, such as data tables 304 in FIG. 3. Those of ordinary skill in the art will appreciate that any data may be used in an implementation of the illustrative embodiments.

Tables 500, 510, 520 and 530 show the percentage of good parts (% Good Parts) produced versus a planned production number. The percentage of good parts (% Good Parts) data may be useful in different ways to different users. Therefore, the data may be most valuable if viewed differently by the different users. For example, a person who is a public user accessing a web site to research the company may use the data as a general quality number. A person in the financial department of the company may use the data to forecast the billings for the next month. Further, it is advantageous to control the data a potential customer may view from an external website.

Figure 5A:
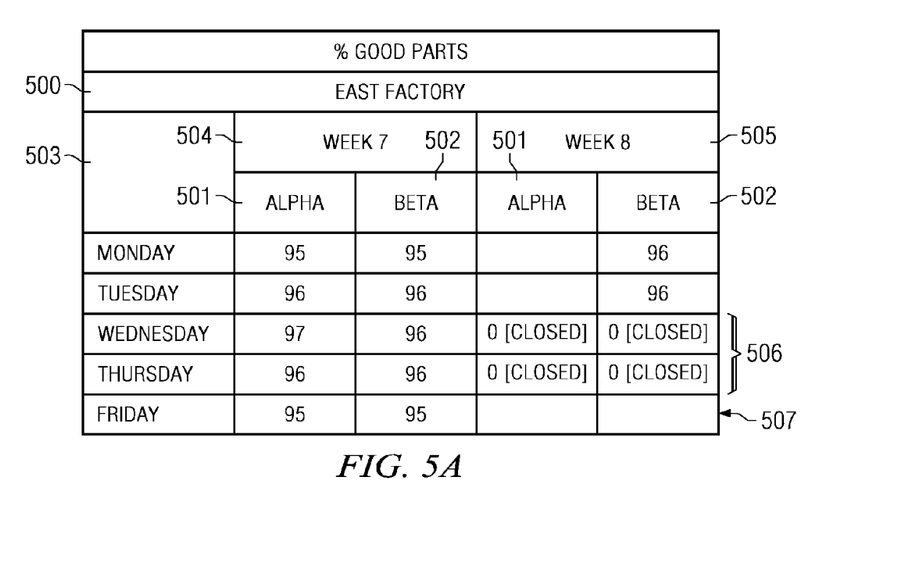
FIGS. 5A, 5B, 5C, and 5D show example data in Tables 500, 510, 520 and 530 in accordance with the illustrative embodiments.
Figure 5B:
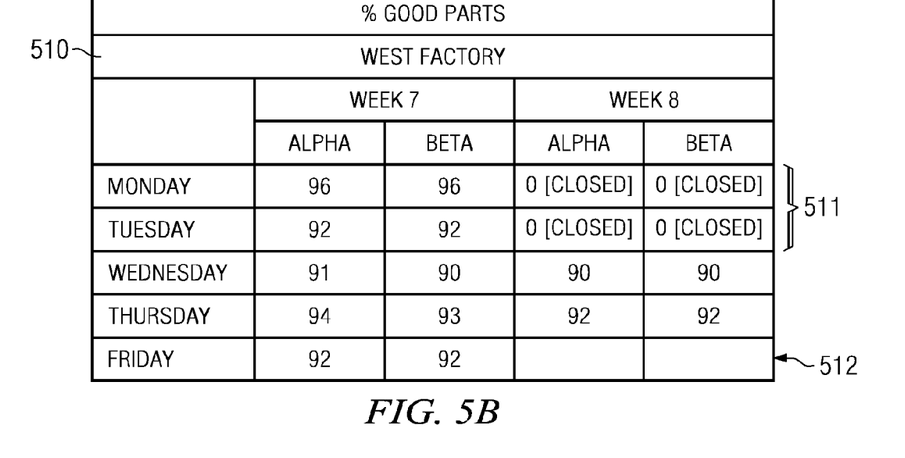

The tables 500 and 510, in FIGS. 5A and 5B, display the daily percentage of good parts produced by the two factories, East Factory 500 and West Factory 510 for two customers Alpha 501 and Beta 502. In addition, Table 520, in FIG. 5C shows averages of the factory numbers for the regional office, while Table 530, in FIG. 5D shows the combined regional averages for different time increments.

Table 500, in FIG. 5A shows the percentage of good parts (% Good Parts) for the East factory. The days of the factory workweek are listed in the first column 503. Data columns 504 and 505 indicate the week the data was produced. Sub-column Alpha 501 and sub-column Beta 502 indicate to which customer the data applies. The rows of the table list the percentage of good parts produced for each day of the workweek in the East factory. Notice that the East factory is closed for Wednesday and Thursday of week 8 506, therefore the percentage of good parts produced is zero on Wednesday and Thursday. In addition, there is no data indicated for Friday of week 8 507.

Table 510, in FIG. 5B, is organized similarly to Table 500, and shows the percentage of good parts for the West factory. Notice Monday and Tuesday the West factory is closed 511, and the percentage of good parts produced was zero. Again, there is no data indicated for Friday of week 8 512.

Figure 5C:
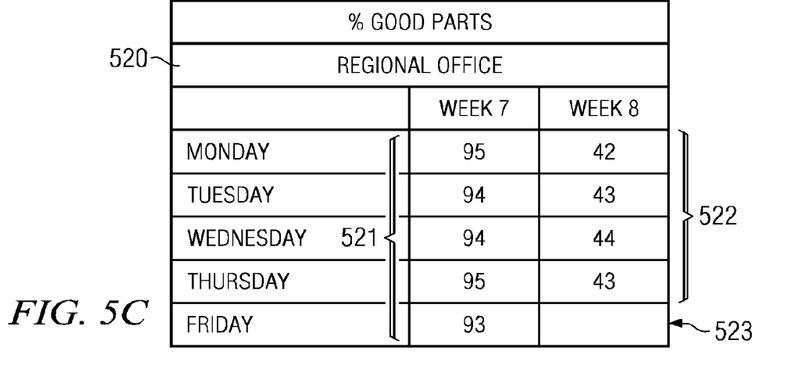
Figure 5D:
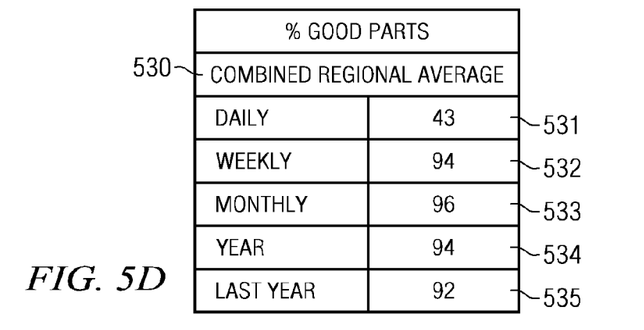

Table 520, in FIG. 5C, shows the combined percentage of good parts (% Good Parts) for both the East and West factories. Notice that the combined percentage is in the nineties for week 7 521 and only in the forties for week 8 522. The low data in week 8 is due to plant closures. Again, Friday of week 8 contains no data 523.

Table 530, in FIG. 5D, shows the combined regional averages for day 531, week 532, month 533, year 534, and the past year 535. Notice that daily average 531 is low due to plant closures and the remaining data indicates high percentages of good parts (% Good Parts).

Figure 6:
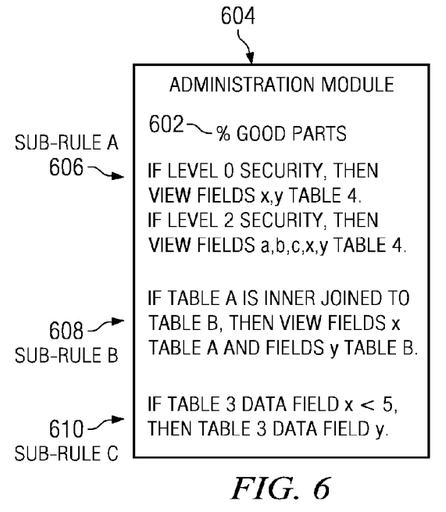
FIG. 6 displays an example rule as defined by a system administrator in accordance with the illustrative embodiments.

FIG. 6 displays an example view rule as defined by a system administrator in accordance with the illustrative embodiments. Query "% Good Parts" 602 is listed in a query module such as query module 400 in FIG. 4. In administration module 604, the example query "% Good Parts" has an associated view rule defined. The view rule for query 602 is a compound rule. How the returned view is altered is determined by which, if any, sub-rule of the view rule is satisfied. A view rule is satisfied if it is true. A view rule may be resolved based on a set of parameters, such as the security level of a user.

In the view rule for query % Good Parts 602, sub-rule A 606 determines the security level of the user making the query. If the security level satisfies the sub-rule, then the sub-rule a true statement and the sub-rule is implemented. In sub-rule A 606, if the security level of the user is 0, then fields x, y in Table 4 is the database view returned. For the example data tables, found in FIGS. 5A, 5B, 5C, and 5D, if a public user (security level 0) queries the data processing system for the percentage of good parts the system returns an altered database view of x, data for this year, and y, data for next year, from Table 4, which in this example is table 530 in FIG. 5D. The resulting view is depicted in Public User View 702 in FIG. 7A.

Further, in sub-rule A 606, if the security level of the user is 2, then the database view is altered to return fields a, b, c, x, and y in Table 4 to the user. Again, for the example data tables, found in FIGS. 5A, 5B, 5C, and 5D, if a financial officer user (security level 2) queries the data processing system for the percentage of good parts the system will alter the database view to return fields a, daily, b, weekly, c, monthly, x, data for this year, and y, data for next year, from table 4, which in this example is table 530 in FIG. 5D. The resulting view is depicted in Financial Officer View 704 in FIG. 7A. Those of ordinary skill in the art will appreciate that many parameters may be used within the scope of the illustrative embodiments. Depending upon the user security level, views displaying different fields from multiple tables have been defined. If a sub-rule is satisfied, no further sub-rules are evaluated.

Sub-rule B 608 of the view rule pertains if the particular tables indicated are inner joined. An inner joined table is formed by the intersection data between tables. In this example, if the query includes Table A inner joined to Table B, then fields e, f, g, h and i of the inner joined table are presented in the returned view. In rule part B 608, if Table A is inner joined to Table B, then fields e, f, g, h, and i in Table AB is the view returned. For example data tables, found in FIGS. 5A, 5B, 5C, and 5D, if East Factory 500 table and West Factory 510 Table are inner joined, the system returns a database view of East Factory data for Monday, and Tuesday as well as West Factory data for Wednesday, and Thursday. The resulting altered database view that is returned is depicted in Customer Beta View 706 in FIG. 7B.

Sub-rule C 610 of the view rule specifies that if Table 3 data field x has less than 5 members, Table 3 data field y will be in the altered view that is returned to the user. Again, for the example data tables found in FIGS. 5A, 5B, 5C, and 5D, if week 8 has less than 5 members, in Regional Office Table 520, then week 7 is the altered database view that is returned. The resulting database view is depicted in Accounting View 708 in FIG. 7C. In another embodiment, if a table has less than a specified number of members, a different table may be defined to be returned in the altered database view. As an example a database view of the last month that has complete data may be returned, rather than an incomplete database view of the current month.

Figure 7A:
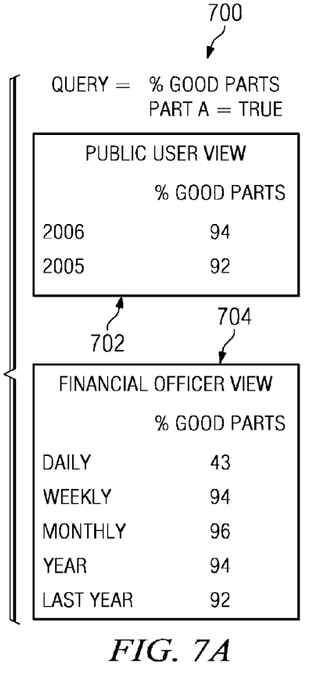
FIGS. 7A, 7B, and 7C are examples of query results in accordance with the illustrative embodiments.
Figure 7B:
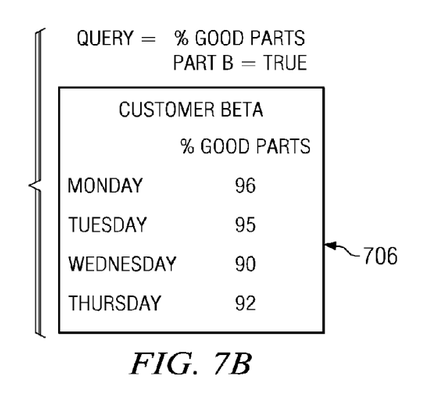
Figure 7C:
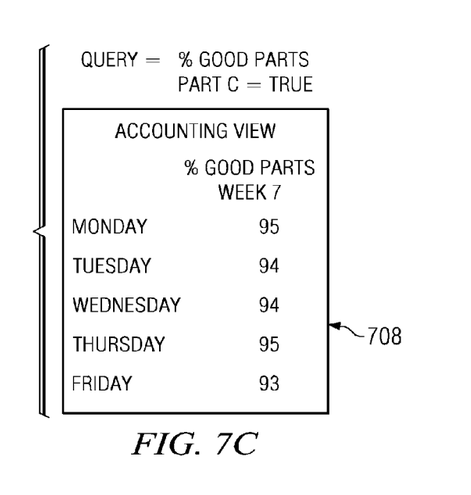

FIGS. 7A, 7B, and 7C are examples of query results in accordance with the illustrative embodiments. The views in FIGS. 7A, 7B, and 7C are based on the data tables in FIGS. 5A, 5B, 5C, and 5D, and the view rule shown in FIG. 6. FIG. 7A shows the database view if sub-rule A 604 in FIG. 6 is satisfied. FIG. 7B shows the database view if sub-rule B 606 in FIG. 6 is satisfied and FIG. 7C shows the database view if sub-rule C 608 in FIG. 6 is satisfied.

FIG. 7A shows the view for the case of two independent users, one a public user and the other user the financial officer of the corporation. Each user is requesting a view of the percentage of good parts. FIG. 7A shows two independent altered views of the example database system, Public User View 702, and Financial Officer View 704. The database view is different depending on the user. Table 702 shows the database view returned to a public user. Public User table 702 shows a database view of percentage good parts for the years 2006 and 2005. The system receives a query for the percentage of good parts from a public user with a zero security level and returns only the fields that have been defined for that user. However, the Financial Officer database view 704 shows data that is targeted specifically for the financial officer. The system altered the view of the database based on the identity of the users. Another embodiment may alter the view of the database based on the location of the user, such as a request coming from the East factory may only show East factory data and likewise a request coming from the West factory may only show West factory data.

FIG. 7B displays an altered view of the example database that shows data from an inner joined table. Consider the case of a customer Beta that is interested in viewing the percent of good parts produced by the example corporation regardless of the factory in which the parts were produced. A rule part may be specified that returns only the rule-defined fields from an inner joined table such as sub-rule C 608 in FIG. 6. The inner joined table would show all of the data for both factories and both customers. However, the view rule indicates which fields in the inner joined table AB will be returned in the database view. In another embodiment, the dynamically altered view may also depend on the security level of the user.

FIG. 7C displays a altered view of the example database that shows the most recent data set that is complete.

Figure 8:
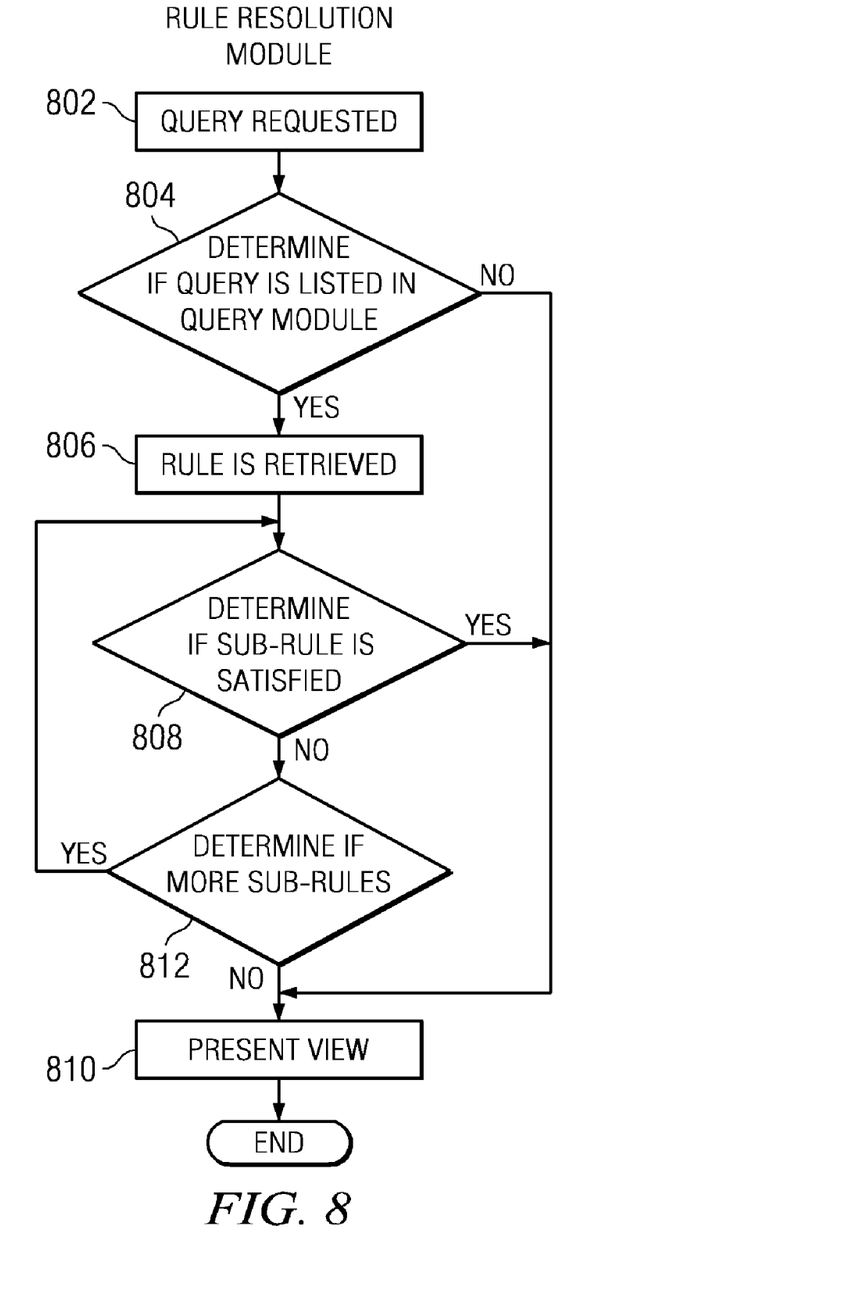
FIG. 8 is a top-level flow chart depicting a method for dynamically altering database views in multiple tables in a database, based on an administrator-configured rule set, in response to a requester query in accordance to the illustrative embodiments.

FIG. 8 is a top-level flow chart illustrating the process followed to resolve a view rule for a query in accordance with the illustrative embodiments. A user queries the database requesting a database view (step 802). A rule resolution module, such as rule resolution module 308 in FIG. 3, determines if the view requested is listed in a query module, such as query module 400 in FIG. 4 (step 804). If the view is listed in the query module (yes output to step 804), then the resolution module retrieves the view rule from the administration module (step 806). The resolution module then determines if a first sub-rule is satisfied (step 808). If the first sub-rule is satisfied (yes output of step 808), the resolution module presents the altered view to the user (step 810). If no, a first sub-rule is not satisfied (no output to step 808), then the resolution module checks to see if there are more sub-rules to evaluate (step 812). If there is a next sub-rule (yes output to step 812), the resolution module evaluates the sub-rule (step 808). If there is no next sub-rule (no output to step 812), the process presents the requested view 810 and ends thereafter. Returning to step 804 if there is no view rule listed in the query module, the process presents the view 810 requested and the process ends thereafter. In other words, if none of the sub-rules are satisfied, the system returns the query unaltered.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for dynamically altering database views, the computer implemented method comprising:
responsive to receiving a query from a user requesting a database view, determining whether the query is listed in a query module, wherein each query listed in the query module has an associated view rule;
responsive to determining that the query is listed in the query module, retrieving the associated view rule for the query, wherein the associated view rule is a compound view rule that includes a plurality of sub-rules that are sequenced and evaluated in order of priority;
determining whether a sub-rule within the plurality of sub-rules is satisfied first in the order of priority;
responsive to determining that a sub-rule within the plurality of sub-rules is satisfied first in the order of priority, altering the database view to form an altered database view based on the sub-rule that was satisfied first, wherein remaining sub-rules within the plurality of sub-rules in the order of priority are not evaluated after the sub-rule is satisfied; and returning the altered database view to the user.

2. The computer implemented method of claim 1, further comprising:

altering the database view to based on a security level of the user.

3. The computer implemented method of claim 2, wherein the associated view rule of includes the syntax:

CREATE VIEW viewname AS
(when <access to view through group/user> then SELECT fieldX, fieldY FROM tableZ), wherein viewname is the user name of the view requested, and wherein X and Y identify fields in an identified table Z.

4. The computer implemented method of claim 1, further comprising:

altering the database view based on a physical location of the user.

5. The computer implemented method of claim 1, further comprising:

responsive to tables being inner joined by the query, altering the database view based on the tables being inner joined.

6. The computer implemented method of claim 1, wherein the associated view rule includes the syntax:

CREATE VIEW viewname AS
(when <innerjoined to tableb> then SELECT fieldX, fieldY FROM tableZ), wherein viewname is the name of the view requested, and wherein X and Y identify fields in an identified table Z.

7. The computer implemented method of claim 1, wherein a database view rule part is comprised of the syntax:

CREATE VIEW viewname AS
(when <sql select operator value> then SELECT fieldX, fieldY FROM tableZ), wherein viewname is the user name of the view requested, and wherein X and Y identify fields in an identified table Z.

8. The computer implemented method of claim 1, further comprising:

responsive to results of a select statement, altering the database view based on the results of the select statement.

9. A computer program product stored in a non-transitory computer usable medium including computer usable program code tangibly embodied therein for dynamically altering database views, the computer program product comprising:

computer usable program code for responding to receiving a query from a user requesting a database view, determining whether the query is listed in a query module, wherein each query listed in the query module has an associated view rule;

computer usable program code for responding to determining that the query is listed in the query module, retrieving the associated view rule for the query, wherein the associated view rule is a compound view rule that includes a plurality of sub-rules that are sequenced and evaluated in order of priority;

computer usable program code for determining whether a sub-rule within the plurality of sub-rules is satisfied first in the order of priority;

computer usable program code for responding to determining that a sub-rule within the plurality of sub-rules is satisfied first in the order of priority, altering the database view to form an altered database view based on the sub-rule that was satisfied first, wherein remaining sub-rules within the plurality of sub-rules in the order of priority are not evaluated after the sub-rule is satisfied; and computer usable program code for returning the altered database view to the user.

10. The computer program product of claim 9, further comprising:

computer usable program code for responding to results of a select statement, altering the database view based on the results of the select statement.

11. A data processing system comprising:

a bus system;

a communications system connected to the bus system;

a memory connected to the bus system, wherein the memory includes a set of instructions; and a processing unit connected to the bus system, wherein the processing unit executes the set of instructions to determine whether a query is listed in a query module in response to receiving the query from a user requesting a database view, wherein each query listed in the query module has an associated view rule; retrieve the associated view rule for the query in response to determining that the query is listed in the query module, wherein the associated view rule is a compound view rule that includes a plurality of sub-rules that are sequenced and evaluated in order of priority; determining whether a sub-rule within the plurality of sub-rules is satisfied first in the order of priority; alter the database view to form an altered database view based on the sub-rule that was satisfied first in response to determining that a sub-rule within the plurality of sub-rules is satisfied first in the order of priority, wherein remaining sub-rules within the plurality of sub-rules in the order of priority are not evaluated after the sub-rule is satisfied; and return the altered database view to the user.

12. The data processing system of claim 11, a wherein the processing unit executes a further set of instructions to alter the database view based on a security level of the user.

13. The data processing system of claim 11, wherein the processing unit executes a further set of instructions to alter the database view based on tables being inner joined by the query in response to the tables being inner joined.

14. The data processing system of claim 11, wherein a database view that is dynamically altered depends upon a group/user security level of the view requester.

* * * * *